United States Patent
Sakurai

(10) Patent No.: US 9,311,747 B2
(45) Date of Patent: Apr. 12, 2016

(54) THREE-DIMENSIONAL IMAGE DISPLAY DEVICE AND THREE-DIMENSIONAL IMAGE DISPLAY PROGRAM

(75) Inventor: Satoshi Sakurai, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 334 days.

(21) Appl. No.: 13/879,432

(22) PCT Filed: Nov. 18, 2010

(86) PCT No.: PCT/JP2010/006770
§ 371 (c)(1),
(2), (4) Date: Apr. 15, 2013

(87) PCT Pub. No.: WO2012/066603
PCT Pub. Date: May 24, 2012

(65) Prior Publication Data
US 2013/0194263 A1 Aug. 1, 2013

(51) Int. Cl.
*G06T 17/00* (2006.01)
*G09G 5/00* (2006.01)
*G06T 17/05* (2011.01)
*G06T 17/20* (2006.01)

(52) U.S. Cl.
CPC ............. *G06T 17/005* (2013.01); *G06T 17/05* (2013.01); *G06T 17/20* (2013.01)

(58) Field of Classification Search
CPC .......... G06T 17/20; G06T 15/30; G06T 11/00
USPC ................................. 345/420, 621, 622, 630
See application file for complete search history.

(56) References Cited

U.S. PATENT DOCUMENTS

| | | | |
|---|---|---|---|
| 6,614,432 B1 * | 9/2003 | Merrill | 345/428 |
| 2005/0035883 A1 * | 2/2005 | Kameda et al. | 340/995.1 |
| 2007/0165035 A1 * | 7/2007 | Duluk et al. | 345/506 |
| 2007/0237424 A1 * | 10/2007 | Burg et al. | 382/286 |

(Continued)

FOREIGN PATENT DOCUMENTS

| | | |
|---|---|---|
| JP | 11 73526 | 3/1999 |
| JP | 2002 245486 | 8/2002 |

(Continued)

OTHER PUBLICATIONS

Chang, R., et al., "Legible Simplification of Textured Urban Models," IEEE Computer Graphics and Applications, vol. 28, No. 3, pp. 27-36, (2008).

(Continued)

*Primary Examiner* — Phi Hoang
*Assistant Examiner* — Yi Yang
(74) *Attorney, Agent, or Firm* — Oblon, McClelland, Maier & Neustadt, L.L.P.

(57) ABSTRACT

When generating an approximate right prism model, an approximate right prism model generating unit 14 expresses a hierarchical relationship among original right prism models and approximate right prism models which can be generated by using a tree structure, and generates only a right prism model existing in certain and higher hierarchical layers from among approximate right prism models respectively brought into correspondence with the nodes in the tree structure. Therefore, a three-dimensional virtual environment can be rendered at a high speed and with a high degree of quality even when no large-volume storage unit is installed.

5 Claims, 11 Drawing Sheets

(56) References Cited

U.S. PATENT DOCUMENTS

| | | | |
|---|---|---|---|
| 2008/0267490 A1* | 10/2008 | Gorges et al. | 382/154 |
| 2010/0157110 A1* | 6/2010 | Hatanaka et al. | 348/241 |
| 2010/0182339 A1* | 7/2010 | Kitajima et al. | 345/629 |

FOREIGN PATENT DOCUMENTS

| | | |
|---|---|---|
| JP | 2005 56075 | 3/2005 |
| JP | 2006 58244 | 3/2006 |
| JP | 2006 284704 | 10/2006 |

OTHER PUBLICATIONS

International Search Report Issued Feb. 15, 2011 in PCT/JP10/06770 Filed Nov. 18, 2010.

* cited by examiner (a) Right Prism Models (b) Outlines Of Right Prism Models Shown In (a)

(a) Initial Tree Structure (b) Outlines Of Nodes Shown In (a)

(a) Tree Structure To Which Processes Of Up To ST4 Are Applied Once (b) Outlines Of Nodes Shown In (a)

(a) Tree Structure At Time That Processing
By Tree Structure Generating Unit 12 Is Completed (b) Outline Of Node 17 Shown In (a)

(a) Two Original Outlines (b) Initial State Of Approximate Outline
(Convex Closure Of Two Original Outlines)

(c) Vertices Which Can Be Added (d) State In Which One Vertex Is Added (e) State Of Approximate Outline At Time That Processing
By Approximate Outline Generating Unit 12a Is Completed (a) Example Of Outline From Which Approximate Right Prism Model Is Generated (b) Right Prism Shape Generated From Outline Shown In (a)

(a) Visual Point Positions At Time Of Generating Textures For Wall Surfaces (b) Original Right Prism Models To Be Drawn And Visual Point Positions Axis Aligned Bounding Box (AABB)

(a) Visual Point Positions At Time Of Generating Textures For Roofs (b) Original Right Prism Models To Be Drawn And Visual Point Positions

THREE-DIMENSIONAL IMAGE DISPLAY DEVICE AND THREE-DIMENSIONAL IMAGE DISPLAY PROGRAM

FIELD OF THE INVENTION

The present invention relates to a three-dimensional image display device and a three-dimensional image display program for displaying a three-dimensional image according to three-dimensional geometrical information.

BACKGROUND OF THE INVENTION

In order to construct an interactive application using computer graphics, it is necessary to display image information in real time on a display device to present the image information to the user. When rendering a three-dimensional virtual environment which is viewed from a virtual viewpoint as an image presented to the user, the computer needs to carry out a complex computation, such as a projection process, by using many pieces of information including the geometric shape and the colors of the three-dimensional virtual environment, etc.

However, such a three-dimensional virtual environment as one expressing a wide urban area includes a large number of buildings having a simple shape, such as right prisms, and has many models. Therefore, such a three-dimensional virtual environment includes many polygons and the amount of computation at the time of rendering increases. Further, when individually assigning an image called a texture to the surface of each building, it is necessary to alternately send a command for switching between textures and a command for rendering a polygon to graphics hardware. On the other hand, because typical graphics hardware is optimized in such a way as to carry out many rendering processes in response to one command, the rendering speed decreases when receiving many commands.

A three-dimensional image display device disclosed by the following nonpatent reference 1 carries out such a process as shown below in order to render a lot of building models at a high speed and with a high degree of quality. When receiving a set of building models each expressed by a polygon model having a right prism shape (referred to as a "right prism model" from here on) first, the three-dimensional image display device selects a group of right prism models which is a target for approximation from the right prism models expressing the building models, and unifies the group of right prism models to generate an approximate right prism model recursively. The three-dimensional image display device thus renders an approximate right prism model instead of a plurality of right prism models existing at long distances from the point of view, thereby reducing the number of polygons rendered and the number of times that the three-dimensional image display device switches between textures, and implementing high-speed rendering. Further, because right prism models that are replaced by an approximate right prism model at the time of rendering are located at long distances from the point of view, the degradation of the rendering result can be reduced.

However, according to this method, each approximate right prism model has five textures for roofs, and either one of these different textures for roof is used according to a positional relationship with the point of view at the time of rendering. As a result, the amount of texture data increases. Further, because the three-dimensional image display device recursively unifies right prism models on a two-by-two basis, the number of approximate right prism models generated increases and hence the data volume of groups of approximate right prism models generated reaches several times as large as the inputted right prism model group.

On the other hand, because the volume of a storage unit from which data can be read at a high speed, such as a memory or a VRAM, is relatively small in the structure of a typical computer, it is difficult to hold all of a large volume of data at the time of rendering. Particularly in a terminal having a relatively low performance, such as an embedded device, because the volume of a high-speed storage unit installed therein is further small, it is difficult to use the above-mentioned method.

RELATED ART DOCUMENT

Nonpatent Reference

Nonpatent reference 1: Chang, R., Butkiewicz, T., Ziemkiewicz, C., Wartell, Z., Pollard, N., Ribarsky, W. "Legible simplification of textured urban models," IEEE Computer Graphics and Applications, Vol. 28, Issue 3, pp. 27-36, 2008.

SUMMARY OF THE INVENTION

Because a conventional three-dimensional image display device is constructed as above, the conventional three-dimensional image display device can render a three-dimensional virtual environment at a high speed and with a high degree of quality as long as the conventional three-dimensional image display device can hold a lot of approximate right prism models at the time of rendering in a storage unit. A problem is, however, that unless a large-volume storage unit is installed in the conventional three-dimensional image display device, a lot of approximate right prism models cannot be held at the time of rendering and it is therefore difficult to render a three-dimensional virtual environment at a high speed and with a high degree of quality.

The present invention is made in order to solve the above-mentioned problem, and it is therefore an object of the present invention to provide a three-dimensional image display device and a three-dimensional image display program that can render a three-dimensional virtual environment at a high-speed and with a high degree of quality even when no large-volume storage unit is installed.

In accordance with the present invention, there is provided an three-dimensional image display device in which when generating an approximate right prism model, an approximate right prism model generating unit expresses a hierarchical relationship among right prism models included in a set and approximate right prism models which can be generated by using a tree structure, and generates only a right prism model existing in certain and higher hierarchical layers from among approximate right prism models respectively brought into correspondence with nodes in the tree structure.

Because the approximate right prism model generating unit in accordance with the present invention expresses a hierarchical relationship among the right prismmodels included in the set and approximate right prism models which can be generated by using a tree structure when generating an approximate right prism model, and generates only a right prism model existing in certain and higher hierarchical layers from among the approximate right prism models respectively brought into correspondence with the nodes in the tree structure, there is provided an advantage of being able to render a three-dimensional virtual environment at a high speed and with a high degree of quality even when no large-volume storage unit is installed.

EMBODIMENTS OF THE INVENTION

Hereafter, in order to explain this invention in greater detail, the preferred embodiments of the present invention will be described with reference to the accompanying drawings.

Embodiment 1

Figure 1:
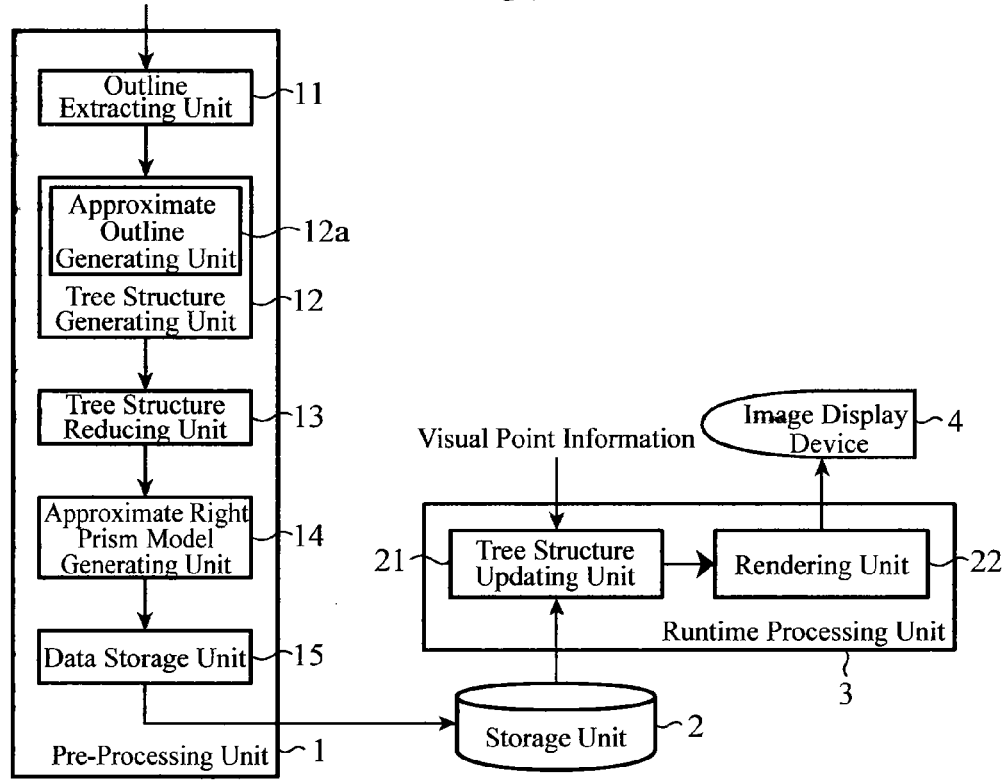
FIG. 1 is a block diagram showing a three-dimensional image display device in accordance with Embodiment 1 of the present invention.

FIG. 1 is a block diagram showing a three-dimensional image display device in accordance with Embodiment 1 of the present invention. Referring to FIG. 1, a pre-processing unit 1 is comprised of a semiconductor integrated circuit in which a CPU is installed, a one chip microcomputer, or the like, and carries out a process of, when receiving a set of right prism models (referred to as "original right prism models" from here on) each of which is a three-dimensional model expressing the three-dimensional shape of a right prism, selecting a group of right prism models which is a target for approximation from among the original right prism models, and unifying the group of right prism models to generate an approximate right prism model. In addition to the process, the pre-processing unit repeatedly carries out a process of selecting a group of right prism models which is a target for approximation from among the approximate right prism model generated thereby and the original right prism models included in the above-mentioned set, and unifying the group of right prism models to generate an approximate right prism model. When generating an approximate right prism model, the pre-processing unit 1 expresses a hierarchical relationship among the original right prism models included in the above-mentioned set and approximate right prism models which can be generated by using a tree structure, and generates only approximate right prism models existing in certain and higher hierarchical layers from among the approximate right prism models which are respectively brought into correspondence with the nodes of the tree structure. The pre-processing unit 1 constructs an approximate right prism model generating unit.

A storage unit 2 is a recording medium such as a hard disk, and records the tree structure generated by the pre-processing unit 1 and so on, as well as the approximate right prism models and the original right prism models generated by the pre-processing unit 1. A runtime processing unit 3 is comprised of a semiconductor integrated circuit in which a CPU is installed, a GPU (Graphics Processing Unit), a one chip microcomputer, or the like, and carries out a process of selecting a right prism model which can be rendered at a high speed and with a certain or higher degree of image quality according to a rendering condition, such as a positional attitude at a virtual viewpoint, from the right prism models (the original right prism models and the approximate right prism models) recorded in the storage unit 2, and rendering the right prism model selected thereby in an appropriate form on an image display device 4.

An outline extracting unit 11 of the pre-processing unit 1 carries out a process of, when receiving a set of original right prism models, extracting the outline of each of the original right prism models by projecting the outline of the roof of each of the original right prism models on a plane parallel to the roof. A tree structure generating unit 12 is provided with an approximate outline generating unit 12a, and the approximate outline generating unit 12a carries out a process of selecting a group of outlines which is a target for approximation from among the outlines of all the original right prism models, and unifying the group of outlines to generate an approximate outline. In addition to the process, the approximate outline generating unit repeatedly carries out a process of selecting a group of outlines which is a target for approximation from among the approximate outline generated thereby and the outlines of all the original right prism models, and unifying the group of outlines to generate an approximate outline. The tree structure generating unit 12 also carries out a process of generating a tree structure expressing a hierarchical relationship among the approximate outlines generated by the approximate outline generating unit 12*a* and the outlines of all the original right prism models.

A tree structure reducing unit 13 carries out a process of deleting nodes existing in certain and lower hierarchical layers (each node with which the outline of an approximate right prism model is brought into correspondence) other than leaf nodes (each node with which the outline of an original right prism model is brought into correspondence) from the outlines brought into correspondence with the nodes of the tree structure generated by the tree structure generating unit 12 to reduce the above-mentioned tree structure. An approximate right prism model generating unit 14 carries out a process of generating an approximate right prism model having the outlines of the approximate right prism models respectively brought into correspondence with nodes (nodes other than the leaf nodes) in the tree structure reduced by the tree structure reducing unit 13 as a base of the approximate right prism model, and having an appropriate height.

Although the example in which the approximate right prism model generating unit 14 generates an approximate right prism model after the tree structure reducing unit 13 reduces the tree structure is shown in this Embodiment 1, the tree structure reducing unit 13 can alternatively reduce the tree structure in which the hierarchical relationship among the original right prism models and the approximate right prism models is expressed after the approximate right prism model generating unit 14 generates an approximate right prism model, and can record the right prism model brought into correspondence with each node of the reduced tree structure (an original right prism model or an approximate right prism model) in the storage unit 2.

A data storage unit 15 carries out a process of recording the right prism model brought into correspondence with each node of the tree structure reduced by the tree structure reducing unit 13 in the storage unit 2. A right prism model storage unit is comprised of the data storage unit 15 and the storage unit 2.

A tree structure updating unit 21 of the runtime processing unit 3 carries out a process of selecting a right prism model which is a target to be rendered from among the right prism models recorded in the storage unit 2. More specifically, the tree structure updating unit 21 carries out a process of estimating a degree of contribution of the last time selected right prism model to the rendering result, the last time selected right prism model being included in the right prism models recorded in the storage unit 2, and, when the degree of contribution which is the estimation result is greater than a threshold Th1 of the node brought into correspondence with the right prism model which has been selected last time (a first threshold: a threshold set for the node brought into correspondence with the selected right prism model), selecting the right prism model brought into correspondence with a child node of the right prism model which has been selected last time. In contrast, the tree structure updating unit carries out a process of, when the degree of contribution is less than a threshold Th1 of the parent node (a second threshold: a threshold set for the parent node of the node brought into correspondence with the selected right prism model) less than the threshold Th1, selecting the right prism model brought into correspondence with the parent node of the right prism model which has been selected last time, otherwise selecting the right prism model which has been selected last time. The tree structure updating unit 21 constructs a rendering model selecting unit.

A rendering unit 22 carries out a process of rendering the right prism model selected by the tree structure updating unit 21 on the image display device 4. More specifically, when the right prism model selected by the tree structure updating unit 21 is changed to the right prism model brought into correspondence with the parent node of the last time selected right prism model, the rendering unit 22 repeats the rendering of the last time selected right prism model while enlarging or reducing the last time selected right prism model until the height of the last time selected right prism model becomes equal to that of the right prism model brought into correspondence with the parent node, and, after that, renders the right prism model brought into correspondence with the parent node on the last time selected right prism model in a semi-transparent way and repeats the rendering of the right prism model brought into correspondence with the parent node while increasing the degree of untransparency of this right prism model. In contrast, when the right prism model selected by the tree structure updating unit 21 is changed to the right prism model brought into correspondence with a child node of the last time selected right prism model, the rendering unit renders the right prism model brought into correspondence with the child node after enlarging or reducing the right prism model in such a way that the height of the right prism model brought into correspondence with the child node matches that of the last time selected right prism model, and, after rendering the last time selected right prism model on the right prism model brought into correspondence with the child node in a semi-transparent way, repeats the rendering of the last time selected right prism model while increasing the degree of transparency of the last time selected right prism model until this right prism model becomes transparent, and then repeats the rendering of the right prism model brought into correspondence with the child node while enlarging or reducing the right prism model brought into correspondence with the child node until the height of the right prism model brought into correspondence with the child node returns to its original height. The rendering unit 22 constructs a right prism model rendering unit.

In the example shown in FIG. 1, the outline extracting unit 11, the tree structure generating unit 12, the tree structure reducing unit 13, the approximate right prism model generating unit 14, the data storage unit 15, the tree structure updating unit 21, and the rendering unit 22, which are the components of the three-dimensional image display device, can consist of pieces of hardware for exclusive use (e.g., semiconductor integrated circuits in each of which a CPU is mounted, GPUs, one chip microcomputers, or the like), respectively. As an alternative, the three-dimensional image display device can consist of a computer, and a program in which the processes carried out by the outline extracting unit 11, the tree structure generating unit 12, the tree structure reducing unit 13, the approximate right prism model generating unit 14, the data storage unit 15, the tree structure updating unit 21, and the rendering unit 22 are described can be stored in a memory of the computer and the CPU of the computer can be made to execute the program stored in the memory.

Figure 2:
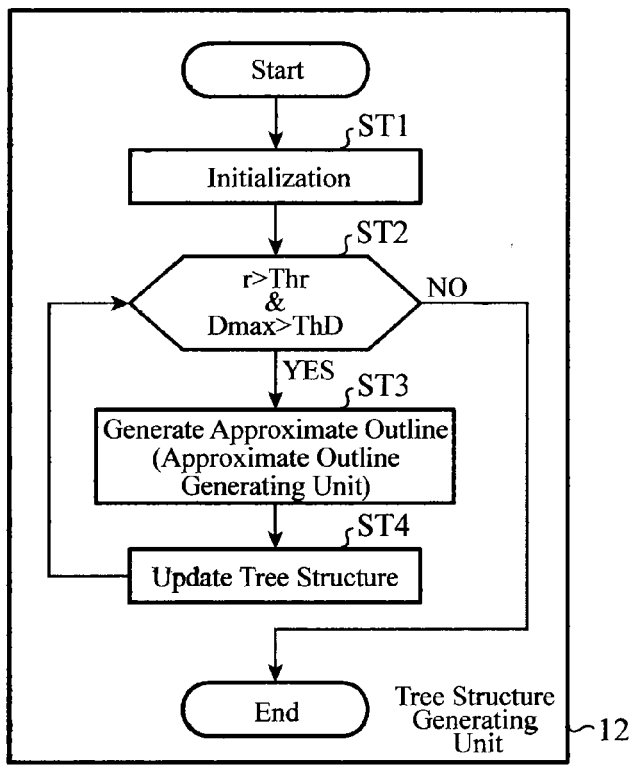
FIG. 2 is a flow chart showing processing carried out by a tree structure generating unit 12 of the three-dimensional image display device in accordance with Embodiment 1 of the present invention.
Figure 3:
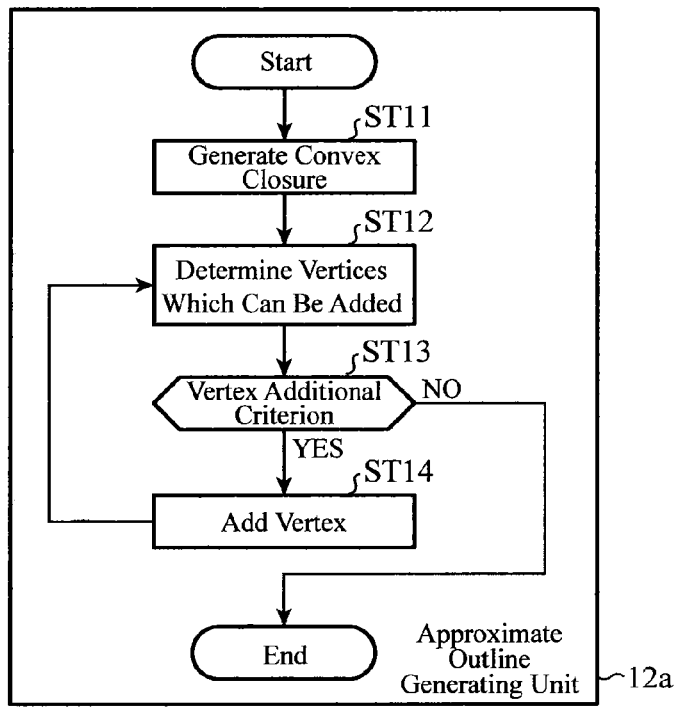
FIG. 3 is a flow chart showing processing carried out by an approximate outline generating unit 12a of the three-dimensional image display device in accordance with Embodiment 1 of the present invention.
Figure 4:
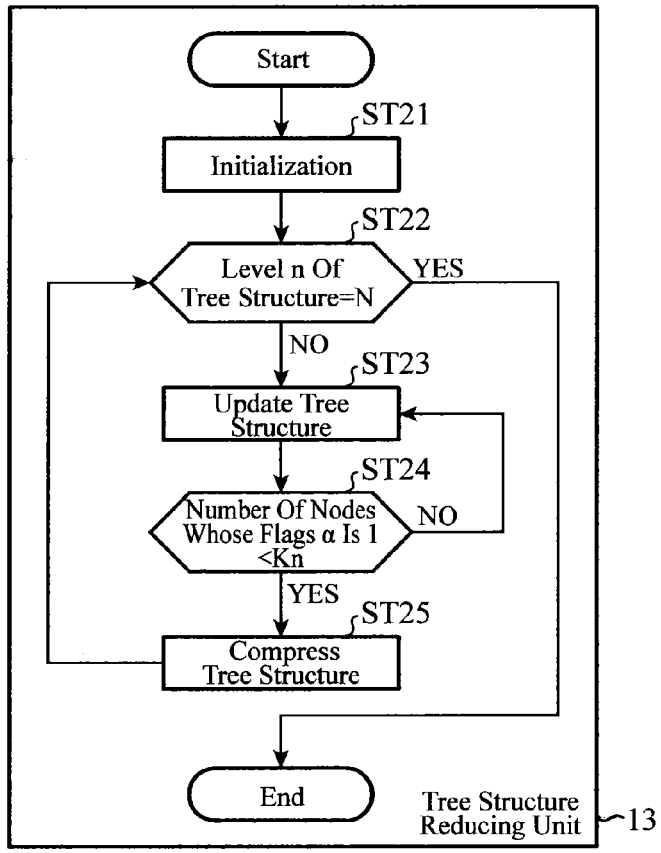
FIG. 4 is a flow chart showing processing carried out by a tree structure reducing part 13 of the three-dimensional image display device in accordance with Embodiment 1 of the present invention.
Figure 5:
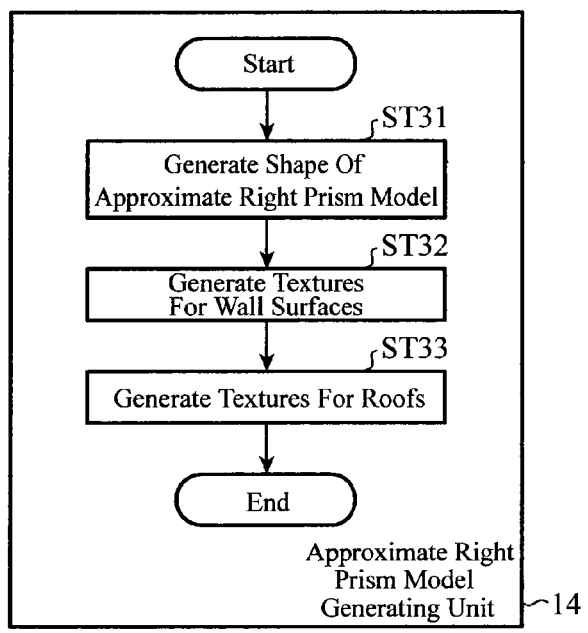
FIG. 5 is a flow chart showing processing carried out by an approximate right prism model generating unit 14 of the three-dimensional image display device in accordance with Embodiment 1 of the present invention.
Figure 6:
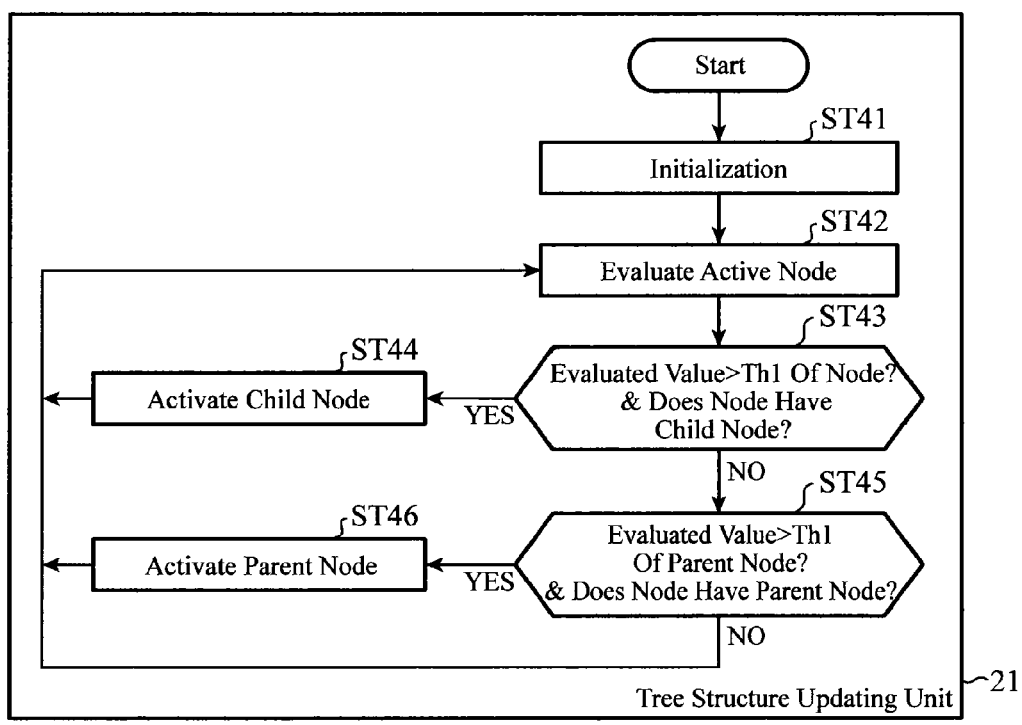
FIG. 6 is a flow chart showing processing carried out by a tree structure updating unit 21 of the three-dimensional image display device in accordance with Embodiment 1 of the present invention.
Figure 7:
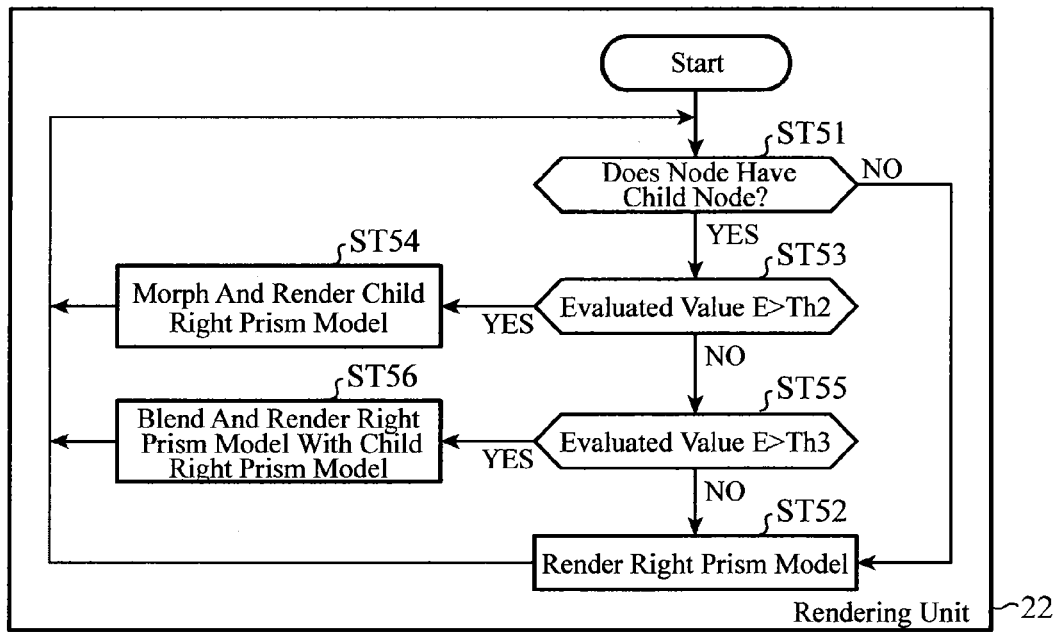
FIG. 7 is a flow chart showing processing carried out by a rendering unit of the three-dimensional image display device in accordance with Embodiment 1 of the present invention.

FIG. 2 is a flow chart showing the processing carried out by the tree structure generating unit 12 of the three-dimensional image display device in accordance with Embodiment 1 of the present invention. FIG. 3 is a flow chart showing the processing carried out by the approximate outline generating unit 12*a* of the three-dimensional image display device in accordance with Embodiment 1 of the present invention. FIG. 4 is a flow chart showing the processing carried out by the tree structure reducing unit 13 of the three-dimensional image display device in accordance with Embodiment 1 of the present invention. FIG. 5 is a flow chart showing the processing carried out by the approximate right prism model generating unit 14 of the three-dimensional image display device in accordance with Embodiment 1 of the present invention. FIG. 6 is a flow chart showing the processing carried out by the tree structure updating unit 21 of the three-dimensional image display device in accordance with Embodiment 1 of the present invention. FIG. 7 is a flow chart showing the processing carried out by the rendering unit 22 of the three-dimensional image display device in accordance with Embodiment 1 of the present invention.

Next, the operation of the three-dimensional image display device will be explained. When receiving a set of original right prism models, the outline extracting unit 11 of the preprocessing unit 1 projects the outline of the roof of each of all the original right prism models on a plane parallel to the roof to extract the outline of each of the original right prism models. In this embodiment, a right prism model expresses the three-dimensional shape of a right prism, and is a three-dimensional model having an arbitrary image on a surface thereof. More specifically, a data structure expressing a right prism model is arbitrary as long as the data structure can express a three-dimensional right prism and makes it possible to render arbitrary images by assigning these images to the bases and side surfaces of the right prism, respectively. In this Embodiment 1, a three-dimensional polygon model to which textures are assigned is used as an example of a typical data structure which constructs a three-dimensional model. Further, in this Embodiment 1, it is assumed that the bases of each of all the right prism models are perpendicular to a perpendicular direction of a virtual space, and the upper one in the perpendicular direction of the two bases of each of the right prism models is referred to as the roof of this right prism model, and each side surface of each of the right prism models is referred to as a wall surface of this right prism model.

Figure 8:
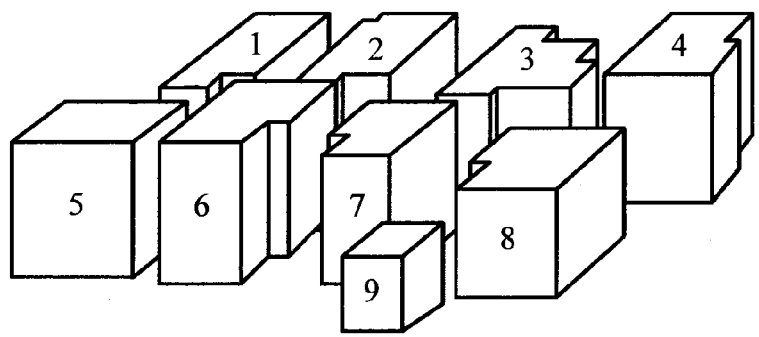
FIG. 8(a) is a view showing an example of original right prism models received by an outline extracting unit 11.
FIG. 8(b) is an explanatory drawing showing the outline of each of original right prism models extracted by an outline extracting unit 11.
Figure 8:
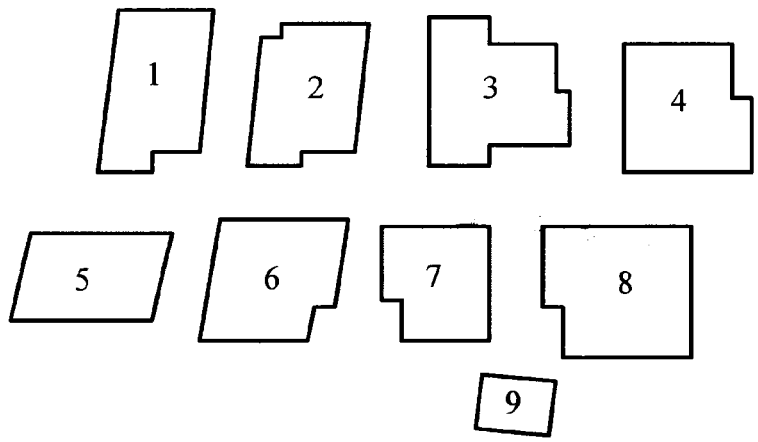

FIG. 8(a) shows an example of the set of original right prism models received by the outline extracting unit 11, and FIG. 8(b) is an explanatory diagram showing the outline of each of the original right prism models extracted by the outline extracting unit 11. In FIG. 8, the example in which nine original right prism models are inputted is shown. Reference numerals (1 to 9) respectively attached to the original right prism models shown in FIG. 8 denote IDs each for identifying an original right prism model, and these IDs are respectively assigned to the original right prism models by the outline extracting unit 11.

After the outline extracting unit 11 extracts the outline of each of the original right prism models, the tree structure generating unit 12 generates a tree structure expressing a hierarchical relationship among the outlines of approximate outlines generated by the approximate outline generating unit 12a, which will be mentioned below, and the outlines of the original right prism models. Hereafter, the process of generating a tree structure which is carried out by the tree structure generating unit 12 will be explained concretely.

Figure 9:
FIG. 9(a) is a view showing a tree structure at a time of initialization.
FIG. 9(b) is an explanatory drawing showing the outlines each brought into correspondence with a node in the tree structure shown in FIG. 9(a)
Figure 9:
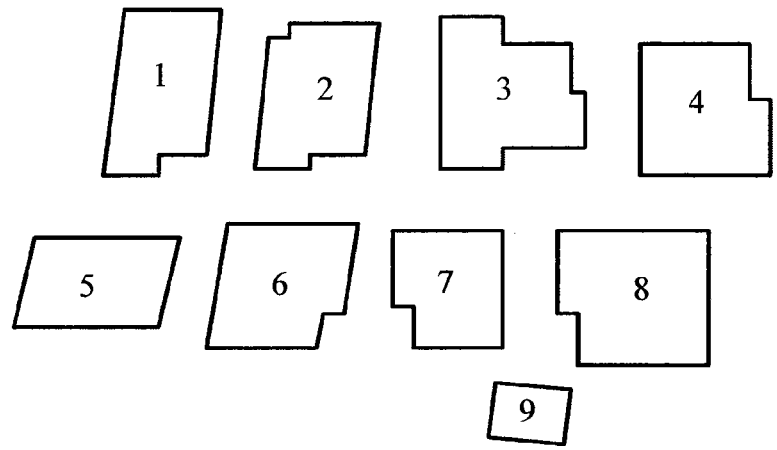

After the outline extracting unit 11 extracts the outlines of the original right prism models, the tree structure generating unit 12 generates a tree structure in which the ID assigned to each of the outlines is defined as a leaf node as an initializing process first (step ST1 of FIG. 2). Because no hierarchization has been carried out yet at the time of the initialization, each node is a root node while being a leaf node. FIG. 9(a) shows the tree structure at the time of the initialization in which all the nodes corresponding to the outlines of the original right prism models have no connection relation, and each of the nodes is a root one while being a leaf one. FIG. 9(b) shows the outlines each brought into correspondence with a node in the tree structure shown in FIG. 9(a).

The tree structure generating unit 12 further calculates an evaluated value D showing a degree of ease of unifying outlines for each of all groups of two of the outlines each brought into correspondence with a leaf node in the tree structure (in the example of FIG. 9, for each of all groups of two of the nine outlines) as an initializing process (step ST1). As a method of calculating the evaluated value D, for example, a method (refer to the following equation (1)) of calculating a higher value with decrease in the distance L between the two outlines of each group, a method (refer to the following equation (2)) of calculating a higher value with decrease in the difference H in height between two corresponding right prism models from which the two outlines of each group are extracted, or the like can be provided.

$$D=a/L \qquad (1)$$

where a is an arbitrary constant.

$$D=b/H \qquad (2)$$

where b is an arbitrary constant.

When the initializing processes are completed, the tree structure generating unit 12 compares the number of roots r (in the case of FIG. 9, r=9 at the time that the initializing processes are completed) with a preset threshold Thr, and also compares a maximum Dmax of all the evaluated values D with a preset threshold ThD (step ST2). When the number of roots r of the tree structure is larger than the threshold Thr and the maximum Dmax is larger than the threshold ThD, the tree structure generating unit 12 selects the group of two outlines for which the evaluated value D is the maximum Dmax, and outputs a command for generating an approximate outline of the two outlines to the approximate outline generating unit 12a (step ST3). In contrast, when the number of roots r of the tree structure is equal to or smaller than the threshold Thr or when the maximum Dmax is equal to or smaller than the threshold ThD, the tree structure generating unit ends the process of generating a tree structure.

Figure 10:
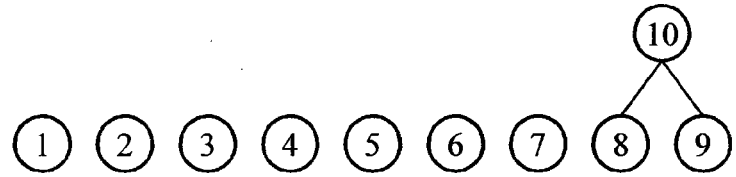
FIG. 10(a) is a view showing the tree structure in which processes of up to step ST4 have been applied to the tree structure in the initialized state once.
FIG. 10(b) is an explanatory drawing showing the outlines each brought into correspondence with a root node (each un-unified node is also a leaf node) in the tree structure shown in FIG. 10(a)
Figure 10:
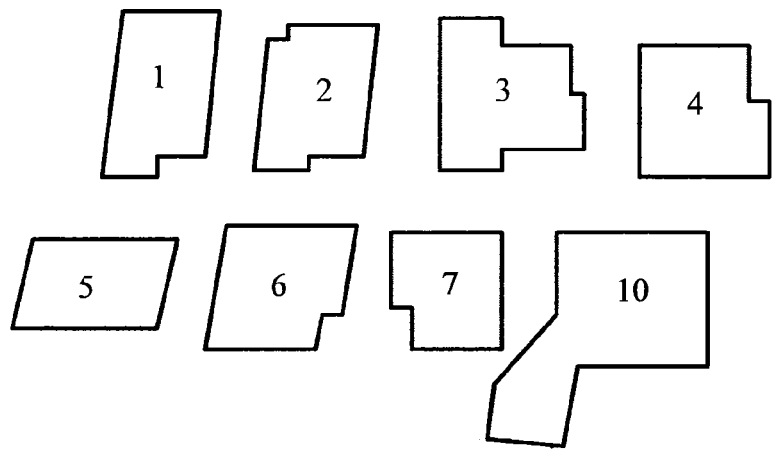

After the approximate outline generating unit 12a generates an approximate outline (the process of generating an approximate outline which is carried out by the approximate outline generating unit 12a will be mentioned below), the tree structure generating unit 12 assumes that the node corresponding to the approximate outline is the parent node of the two nodes corresponding to the two outlines, and adds a new ID to the node corresponding to the approximate outline to update the tree structure (step ST4). The tree structure generating unit 12 further re-calculates an evaluated value D for each of all groups of two of the outlines respectively brought into correspondence with the nodes in the updated tree structure. FIG. 10(a) shows the tree structure in which the processes of up to step ST4 have been applied to the tree structure in the initialized state once, and FIG. 10(b) shows the outlines each brought into correspondence with a root node (each un-unified node is a leaf node) in the tree structure shown in FIG. 10(a). In the example shown in FIG. 10, an outline of ID8 and an outline of ID9 are approximated to generate an approximate outline of ID10.

The tree structure generating unit 12 repeatedly carries out the processes of steps ST2 to ST4 until the number of roots r of the updated tree structure becomes equal to or smaller than the threshold Thr or the maximum Dmax of the evaluated values D becomes equal to or smaller than the threshold ThD.

Figure 11:
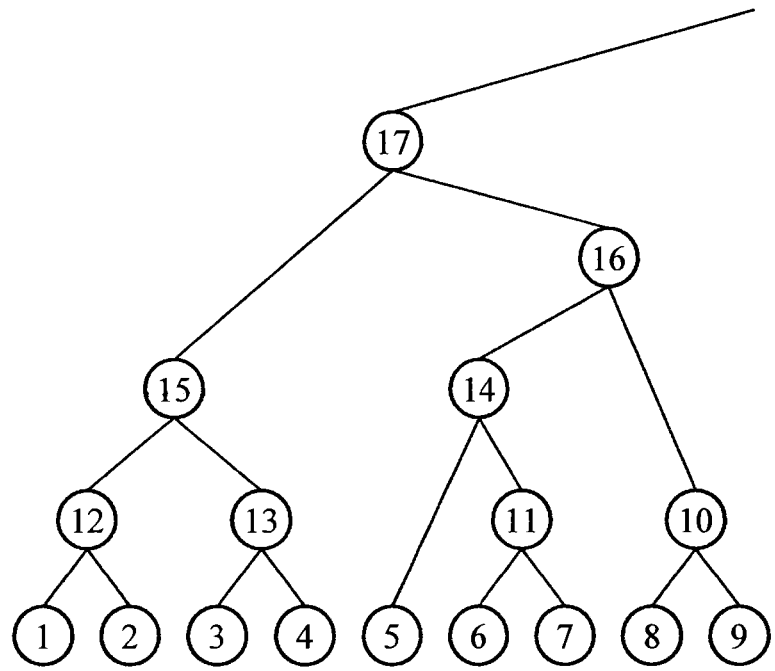
FIG. 11(a) is a view showing the tree structure at a time when the tree structure generating unit 12 completes its processing.
FIG. 11(b) is an explanatory drawing showing an approximate outline into which all outlines are unified.
Figure 11:
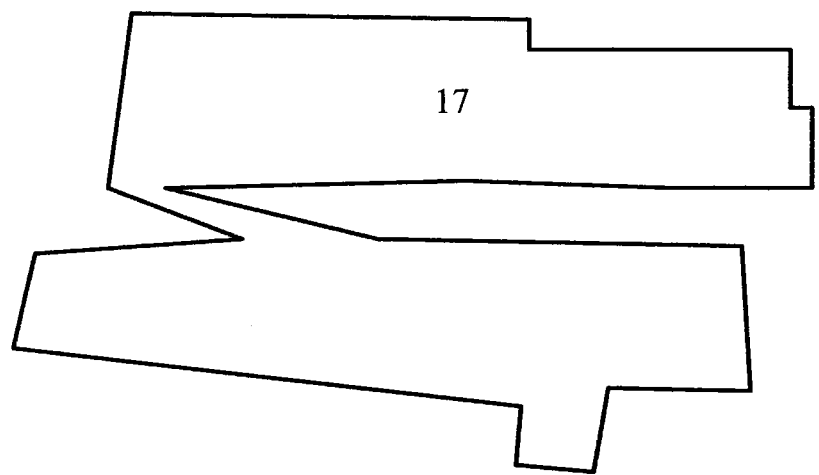

FIG. 11(a) shows the tree structure at the time that the tree structure generating unit 12 completes the processing, and FIG. 11(b) shows an approximate outline (an outline brought into correspondence with a node 17) into which all the outlines are unified.

Figure 12:
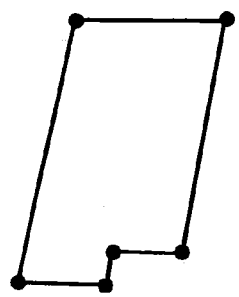
FIG. 12 is an explanatory drawing showing a process of generating an approximate outline.
Figure 12:
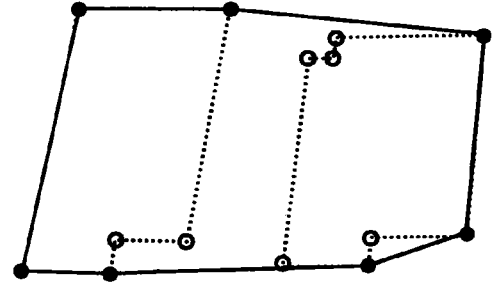
Figure 12:
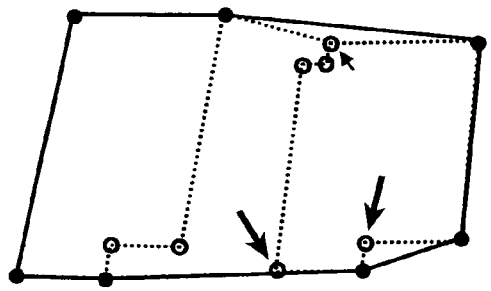
Figure 12:
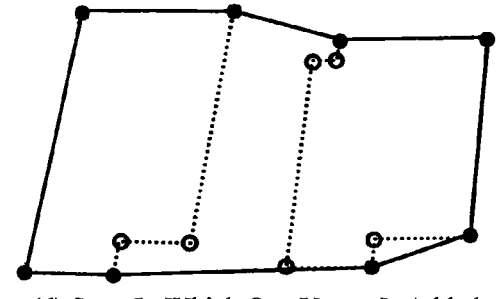
Figure 12:
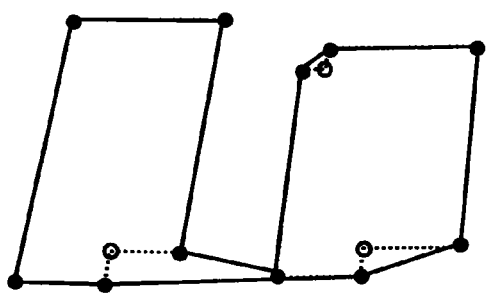

Hereafter, the process of generating an approximate outline which is carried out by the approximate outline generating unit 12a will be explained. FIG. 12 is an explanatory drawing showing the process of generating an approximate outline. When receiving the command for generating an approximate outline of the two outlines from the tree structure generating unit 12, the approximate outline generating unit 12a generates, as an initial state of the approximate outline of the two outlines (referred to as the "original outlines" from here on), a convex closure for all the vertices which construct the two original outlines, as shown in FIG. 12(b) (step ST11 of FIG. 3).

After generating a convex closure for all the vertices, the approximate outline generating unit 12a determines vertices that can be added to the approximate outline from among the vertices that are included in the original outlines, but not included in the approximate outline, as shown in FIG. 12(c) (step ST12). A vertex that can be added to the approximate outline is the one that divides one of the sides of the approximate outline and that does not allow the approximate outline to intersect the original outline and the approximate outline itself when connected with the vertices at the endpoints of the divided side.

When the vertices that can be added to the approximate outline exist and a vertex additional criterion is satisfied (e.g., when the number of vertices of the approximate outline is smaller than a fixed percentage of the sum of the number of vertices of the two original outlines), the approximate outline generating unit 12a selects the vertex that can reduce the inner area of the approximate outline most from among the vertices that have been specified previously and that can be added to the approximate outline, and adds the vertex selected thereby to the approximate outline, as shown in FIG. 12(d) (step ST14). In contrast, when no vertices that can be added to the approximate outline exist or when the vertex additional criterion is not satisfied (e.g., when the number of vertices of the approximate outline is equal to or larger than the fixed percentage of the sum of the number of vertices of the two original outlines), the approximate outline generating unit 12a ends the process of generating an approximate outline. FIG. 12(e) shows an approximate outline which is acquired when the process of generating an approximate outline carried out by the approximate outline generating unit 12a is ended.

Figure 13:
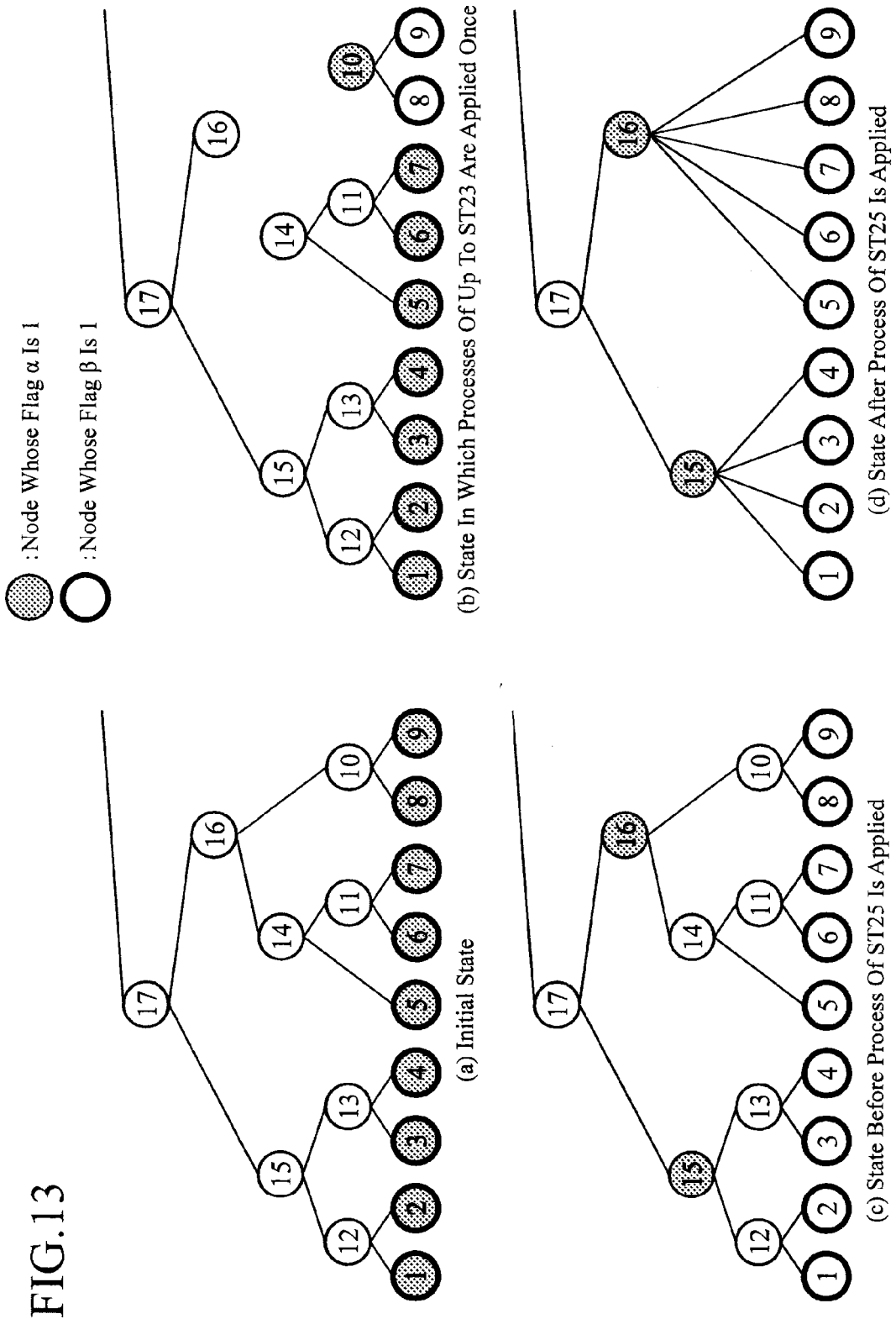
FIG. 13 is an explanatory drawing showing a process of reducing the tree structure.

After the tree structure generating unit 12 generates the tree structure, the tree structure reducing unit 13 deletes the nodes existing in certain and lower hierarchical layers (nodes with each of which the outline of an approximate right prism model is brought into correspondence) other than the leaf nodes (the nodes with which the outlines of the original right prism models are brought into correspondence) from the outlines respectively brought into correspondence with all the nodes of the tree structure to reduce the tree structure. Hereafter, the process of reducing the tree structure which is carried out by the tree structure reducing unit 13 will be explained concretely. FIG. 13 is an explanatory drawing showing the process of reducing the tree structure.

After the tree structure generating unit 12 generates the tree structure, the tree structure reducing unit 13 adds two types of binary flags (referred to as a "flag α" and a "flag β" from here on) to each of the nodes of the tree structure as an initializing process (step ST21 of FIG. 4). At this time, the tree structure generating unit sets the flag α and the flag β that are added to each leaf node to "1", and also sets the flag α and the flag β that are added to each node other than leaf nodes to "0" (refer to FIG. 13(a)). The tree structure reducing unit 13 further initializes a level n which is a variable showing the depth of the current tree structure to "0", and also determines a level N showing the depth of a final tree structure. A method of determining the level N is arbitrary. For example, the level N can be calculated as a power of the number of original right prism models, or the like.

When the level n reaches the level N (step ST22), the tree structure reducing unit 13 ends the process of reducing the tree structure. In contrast, when the level n does not reach the level N (step ST22), the tree structure reducing unit selects the node having the smallest ID from among the nodes each of which is the parent node of a node whose flag α is "1." The tree structure reducing unit then changes the flag α of the node selected thereby to "1" and also changes the flags α of the child nodes of the node selected thereby to "0" to update the tree structure (step ST23). In the example of FIG. 13(a), the tree structure reducing unit selects the node 10 because the node having the smallest ID among the nodes (nodes 10 to 12) each of which is the parent node of a node (node 1, . . . , or 9) whose flag α is "1" is the node 10, and changes the flag α of the node 10 to "1" and also changes the flags α of the nodes 8 and 9 to "0", as shown in FIG. 13(b).

After updating the tree structure, the tree structure reducing unit 13 compares the number of nodes whose flags α are "1" with a predetermined threshold Kn (n=0, 1, . . . , N−1) and, when the number of nodes whose flags α are "1" is equal to or larger than the threshold Kn (step ST24), returns to the process of step ST23 and repeatedly carries out the process of updating the tree structure. The threshold Kn is determined for each level n of the tree structure, and is a natural number meeting the following relationship: K0<K1< . . . <KN−1. In this case, a method of determining the threshold Kn is arbitrary. For example, the threshold Kn can be defined as Kn=a^n by using a certain natural number a.

When the number of nodes whose flags α are "1" becomes smaller than the threshold Kn (step ST24) after repeatedly updating the tree structure, the tree structure reducing unit 13 deletes the nodes existing between the nodes whose flags α are "1" and the nodes whose flags β are "1", and then establishes a direct child-parent relationship between each node whose flag α is "1" and nodes whose flags β are "1" to compress the tree structure (step ST25). In the example of FIG. 13, the threshold Kn is determined as "3", and, when the tree structure is updated to a state shown in FIG. 13(c), the number of nodes whose flags α are "1" becomes smaller than the threshold Kn. Accordingly, as shown in FIG. 13(d), the nodes 12 and 13 existing between the node 15 whose flag α is "1" and the nodes 1 to 4 whose flags β are "1" are deleted while the nodes 10, 11, and 14 existing between the node 16 whose flag α is "1" and the nodes 5 to 9 whose flags β are "1" are deleted. Then, a direct child-parent relationship is established between the node 15 whose flag α is "1" and the nodes 1 to 4 whose flags β are "1", and a direct child-parent relationship is established between the node 16 whose flag α is "1" and the nodes 5 to 9 whose flags β are "1."

After compressing the tree structure, the tree structure reducing unit 13 sets the flag β of each node whose flag α is "1" to "1" and also sets the flag β of each node whose flag α is "0" to "0", and, after that, adds "1" to the level n showing the depth of the current tree structure and returns to the process of step ST23. When the level n does not reach the level N (step ST22), the tree structure reducing unit 13 repeatedly carries out the processes of steps ST23 to ST25. IA, contrast, when the level n reaches the level N (step ST22), the tree structure reducing unit ends the process of reducing the tree structure. Because the number of nodes is limited for the sake of simplicity, the example in which the level N is determined as "1" is shown in FIG. 13, and the process of compressing the tree structure is carried out only once in this example. However, because a large number of nodes exist actually and the level N is determined as two or greater, the process of compressing the tree structure is carried out twice or more in many cases.

Although the example in which the tree structure reducing unit 13 compares the number of nodes whose flags α are "1" with the threshold Kn, and then determines whether or not to compress the tree structure according to the comparison result is shown in this embodiment, the tree structure reducing unit can alternatively determine the difference in total area between original outlines and approximate outlines, or the like as an evaluated value for nodes, and determine whether or not to compress the tree structure according to the result of a comparison between the evaluated value and an appropriate threshold.

Figure 14:
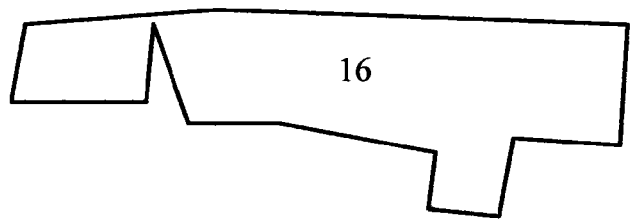
FIG. 14 is an explanatory drawing showing a process of generating an approximate right prism model.
Figure 14:
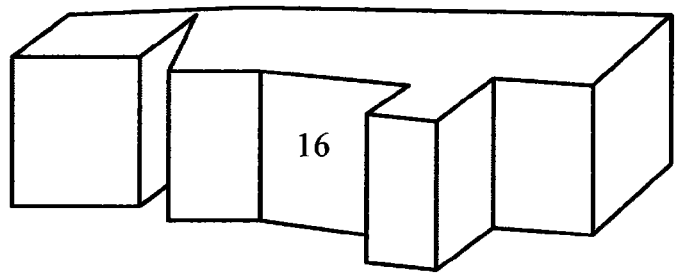
Figure 15:
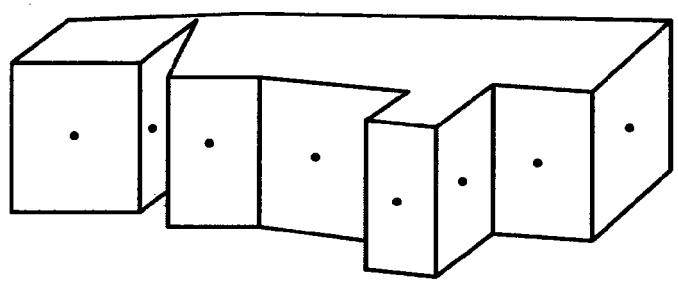
FIG. 15 is an explanatory drawing showing a process of generating an approximate right prism model.
Figure 15:
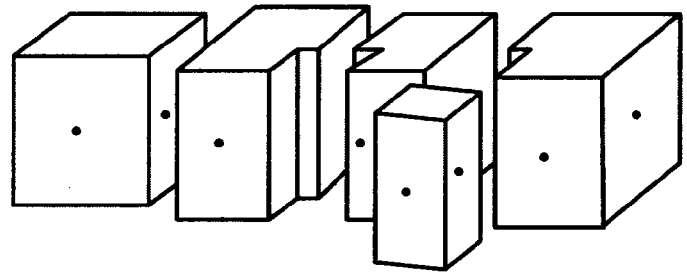
Figure 16:
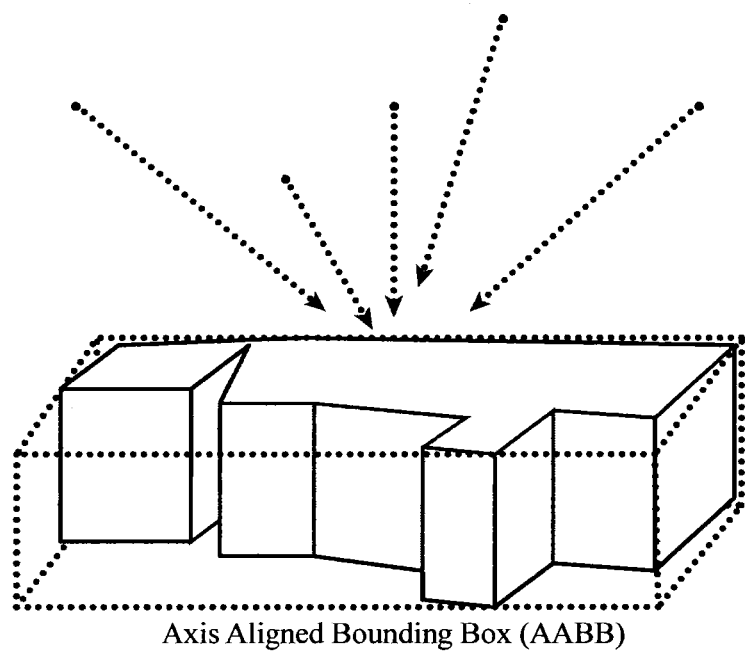
FIG. 16 is an explanatory drawing showing a process of generating an approximate right prism model.
Figure 16:
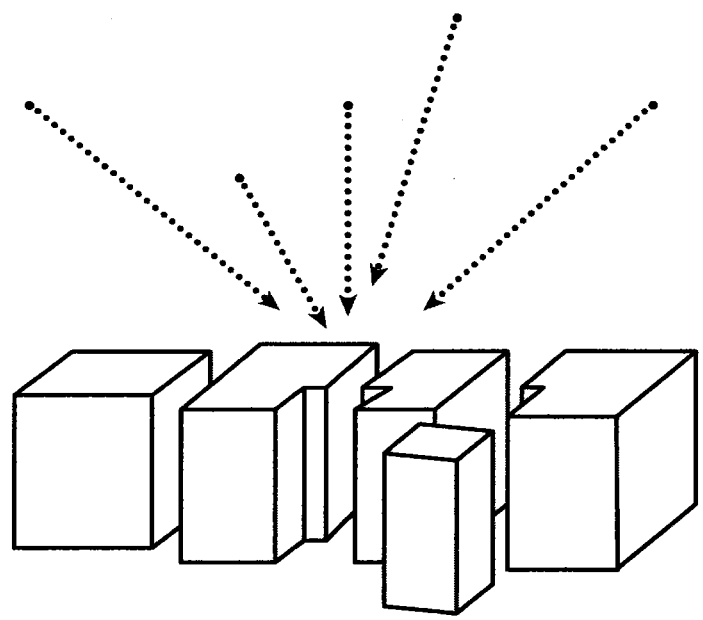

After the tree structure reducing unit 13 reduces the tree structure, the approximate right prism model generating unit 14 defines the outline of the approximate right prism model brought into correspondence with each node (node other than the leaf nodes) in the reduced tree structure as a base of the approximate right prism model to generate an approximate right prism model having an appropriate height. Hereafter, the process of generating an approximate right prism model which is carried out by the approximate right prism model generating unit 14 will be explained concretely. FIGS. 14, 15, and 16 are explanatory drawings showing the process of generating an approximate right prism model.

The approximate right prism model generating unit 14 defines the outline brought into correspondence with each node (node other than the leaf nodes) in the tree structure reduced by the tree structure reducing unit 13 as the peripheral of the base in the right prism shape, and provides the right prism shape with an appropriate height. The approximate right prism model generating unit sets the right prism shape having an appropriate height as the shape of the approximate right prism model corresponding to the node currently being processed (step ST31 of FIG. 5). A method of determining the height of the right prism shape is arbitrary. For example, the approximate right prism model generating unit can determine the height of the right prism shape by calculating a weighted average of the heights of the right prism models respectively brought into correspondence with the child nodes of the node which is the target for generation of the right prism model by using as weights the areas of the roofs of the right prism models. FIG. 14(a) shows the outline brought into correspondence with the node 16, and FIG. 14(b) shows the right prism shape generated from the outline shown in FIG. 14(a).

After generating the shape of an approximate right prism model, the approximate right prism model generating unit 14 generates textures for wall surfaces (step ST32). More specifically, the approximate right prism model generating unit 14 selects one arbitrary rectangle from among the rectangles which construct the wall surfaces of the right prism shape which is the shape of the approximate right prism model, and orients a line of sight toward an inner direction perpendicular to the rectangle to set the rectangle as a viewport. FIG. 15(a) shows the positions of visual points at the time of generating textures for the wall surfaces of the approximate right prism model brought into correspondence with the node 16. In FIG. 15(a), each "•" shows one of the positions of the visual points.

The approximate right prism model generating unit 14 then selects the original right prism models respectively brought into correspondence with the leaf nodes from the descendants of the node currently being processed (in the example of FIG. 15, the node 16), and enlarges or reduces each of the original right prism models in a perpendicular direction to make the height of each of the original right prism model equal to the height of the generated right prism shape. The approximate right prism model generating unit further renders the original right prism models through parallel projection by using the above-mentioned visual points, the above-mentioned lines of sight, and the above-mentioned viewports. The approximate right prism model generating unit 14 sets a visual point, a line of sight, and a viewport to each of all the rectangles which construct the wall surfaces, renders the original right prism models through parallel projection, and defines an object in which the rendering results are connected to each other as the textures for wall surfaces. FIG. 15(b) shows the original right prism models which are rendered, and the positions of the visual points.

After generating textures for wall surfaces, the approximate right prism model generating unit 14 generates textures for roofs (step ST33). More specifically, the approximate right prism model generating unit 14 generates an axis aligned bounding box (referred to as "AABB" from here on) for the right prism shape generated previously first, arranges visual points in a perpendicular upward direction from the center of AABB, orients lines of sight toward a perpendicular downward direction, and sets the upper surface of AABB as a viewport. FIG. 16(a) shows the positions of the visual points which are used when generating textures for roofs. In FIG. 16(a), each "•" shows one of the positions of the visual points.

The approximate right prism model generating unit 14 then selects the original right prism models respectively brought into correspondence with the leaf nodes from the descendant of the node currently being processed (in the example of FIG. 16, the node 16), enlarges or reduces each of the original right prism models in a perpendicular direction in such a way that each of the original right prism models has the same height as the right prism shape generated previously, and renders each of the original right prism models through parallel projection, like in the case of generating textures for wall surfaces. The approximate right prism model generating unit further moves each of the visual points in a direction of +x in the virtual space from its original position above AABB to determine the position where a vector extending from the visual point toward the center of the upper surface of AABB has an angle of 45 degrees with respect to a horizontal plane, and defines the position determined thereby as the position of the visual point. The approximate right prism model generating unit then defines a vector extending from the position of the visual point to the center of the upper surface of AABB as a sight line direction, and renders the above-mentioned original right prism model which is enlarged or reduced through parallel projection by using the upper surface of AABB as a viewport. Similarly, the approximate right prism model generating unit further moves each of the visual points in a direction of −x and in directions of ±y in the virtual space from its original position above AABB and renders the above-mentioned original right prism models each of which is enlarged or reduced by using their respective visual point positions through parallel projection.

According to the above-mentioned procedure, the approximate right prism model generating unit determines five images in which the original right prism models are rendered from five downward directions extending from the visual point positions above AABB as the textures for roofs of the approximate right prism model. FIG. 16(b) shows the original right prism models which are rendered and the positions of the visual points.

The data storage unit 15 records the right prism model (an original right prism model or an approximate right prism model) brought into correspondence with each node in the tree structure reduced by the tree structure reducing unit 13 in the storage unit 2, and also records the reduced tree structure in the storage unit 2.

The tree structure updating unit 21 of the runtime processing unit 3 carries out a process of selecting a right prism model which is a target to be rendered from among the right prism models recorded in the storage unit 2. Hereafter, the process of selecting a right prism model which is carried out by the tree structure updating unit 21 will be explained concretely.

The tree structure updating unit 21 reads the right prism models and the reduced tree structure recorded in the storage unit 2, provides each of all the nodes in the tree structure with a binary flag (referred to as an "active flag" from here on), and sets the active flag of each leaf node to "1" and also sets the active flag of each node other than the leaf nodes to "0", as an initializing process (step ST41 of FIG. 6). In this case, the tree structure updating unit 21 does not have to read all the right prism models recorded in the storage unit 2. For example, the tree structure updating unit can be constructed in such a way as to dynamically read only the right prism models which the rendering unit 22, which will be mentioned below, requires, and the right prism models which there is a high possibility that the rendering unit 22 will require in the near future, and additionally read right prism models or cancel right prism models as needed.

The tree structure updating unit 21 then estimates a degree of contribution of the right prism model brought into correspondence with each node whose active flag is "1" (active node) to the rendering result, and determines the degree of contribution as the evaluated value E of the node. A method of calculating the evaluated value E (contribution) is arbitrary. For example, a value inverse proportional to the distance from the right prism model brought into correspondence with each node to the visual point, a value showing whether the right prism model is inside or outside the field of view, or the like can be calculated as the evaluated value E.

After calculating the evaluated value E of each active node, the tree structure updating unit 21 compares the evaluated value E with the threshold Th1 of the node currently being processed. In this case, the threshold Th1 is determined for each node in the tree structure, and the threshold Th1 set to each parent node is smaller than the threshold Th1 set to each child node and the threshold Th1 set to each child node is smaller than the threshold Th1 set to each grandchild node.

The threshold Th1 set to each parent node<the threshold Th1 set to each child node<the threshold Th1 set to each grandchild node A method of determining the threshold Th1 for the evaluated value E is arbitrary. For example, the threshold is determined by using a value inverse proportional to the size of the right prism model on the screen when the right prism model is rendered, a value proportional to the size of the right prism model, a value inverse proportional to the difference in volume between the right prism model and the original right prism models, or the like.

When the evaluated value E of the active node currently being processed is larger than the threshold Th1 of the node (E>Th1) and the active node has a child node (step ST43), the tree structure updating unit 21 changes the active flag of the active node to "0" and then changes the active flag of the child node of the active node to "1", thereby activating the child node (step ST44).

When the evaluated value E of the active node currently being processed is equal to or smaller than the threshold Th1 of the node (E≤Th1), or when the active node does not have any child node (step ST43), the tree structure updating unit 21 compares the evaluated value E with the threshold Th1 of the parent node of the active node. When the active node currently being processed has a parent node, and the evaluated value E of the active node is smaller than the threshold Th1 of the parent node (step ST44), the tree structure updating unit 21 changes the active flag of the active node to "0" and also changes the active flag of the parent node of the active node to "1", thereby activating the parent node (step ST45). In contrast, when the evaluated value E of the active node currently being processed is equal to or larger than the threshold Th1 of the parent node (E≥Th1) or when the active node does not have any parent node (step ST44), the tree structure updating unit maintains the active state of the active node.

The rendering unit 22 carries out a process of rendering the right prism model selected by the tree structure updating unit 21 on the image display device 4. Hereafter, the process of rendering a right prism model which is carried out by the rendering unit 22 will be explained concretely.

The rendering unit 22 refers to the tree structure updated by the tree structure updating unit 21 to specify the active node and determine whether the active node has a child node (step ST51 of FIG. 7). When the active node does not have any child node, the rendering unit 22 renders the right prism model brought into correspondence with the active node on the image display device 4 (step ST52). A method of rendering a right prism model is arbitrary as long as the method makes it possible to render a three-dimensional model. When rendering a roof, the rendering unit selects and uses the texture for roofs for which the sight line vector at the time of generating the textures for roofs is the closest to the sight line vector at the time of the rendering from among the five textures for roofs generated by the approximate right prism model generating unit 14.

When the active node has a child node (step ST51), the rendering unit 22 compares the evaluated value E of the active node calculated by the tree structure updating unit 21 with a predetermined threshold Th2 (a threshold satisfying Th1>Th2) (step ST53). When the evaluated value E of the active node is larger than the threshold Th2 (E>Th2), the rendering unit 22 enlarges or reduces the right prism model brought into correspondence with the child node of the active node (referred to as a "child right prism model" from here on) in a direction of its height, and renders the right prism model (step ST54). When E=Th2, the height of the child right prism model is equal to the height of the right prism model brought into correspondence with the active node (referred to as the "active right prism model" from here on). When E=Th1, the child right prism model has a height which is linearly-interpolated in such a way that the height is equal to its original height.

When the evaluated value E of the active node is equal to or smaller than the threshold Th2 (E≤Th2), the rendering unit 22 compares the evaluated value E with a predetermined threshold Th3 (a threshold satisfying Th2>Th3) (step ST55). When the evaluated value E of the active node is larger than the threshold Th3 (E>Th3), the rendering unit 22 renders the child right prism model after enlarging or reducing this child right prism model in such a way that the height of the child right prism model is equal to the height of the active right prism model, and further renders the active right prism model at the same position in a semi-transparent way (step ST56). The degree of untransparency of the active right prism model is "0" when E=Th2, and has a value which is linearly interpolated in such a way as to be "1" when E=Th3.

When the evaluated value E of the active node is equal to or smaller than the threshold Th3 (E≤—Th3), the rendering unit 22 renders the active right prism model on the image display device 4, like in the case in which the active node does not have any child node (step ST52).

The enlargement or reduction of the child right prism model and the double rendering of the child right prism model and the active right prism model are intended for relaxing visual changes when replacing the child right prism model with the active right prism model or vice versa according to a change in the rendering conditions, such as a movement of the visual point. Another method which provides the same effect can be alternatively used.

Figure 17:
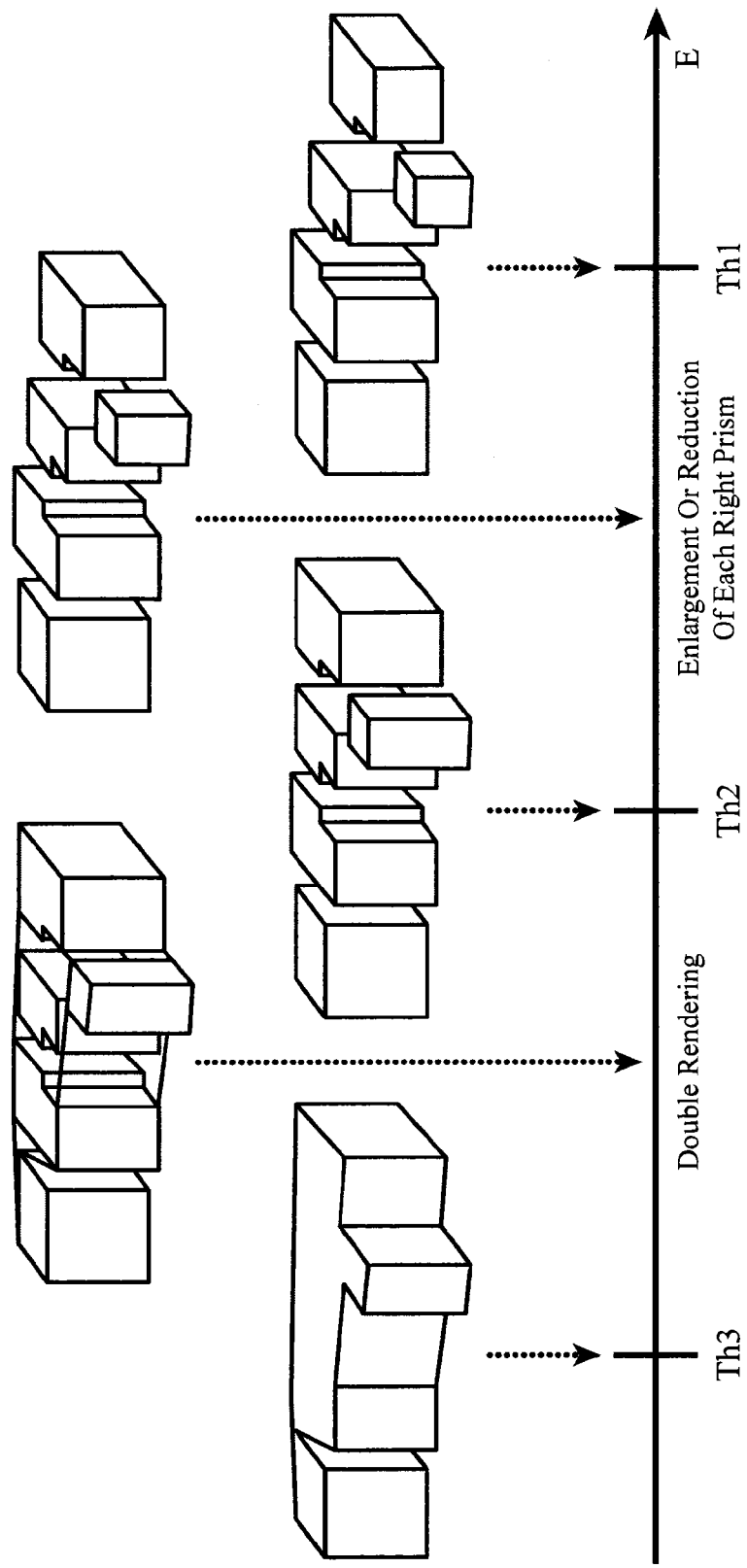
FIG. 17 is an explanatory drawing showing a relationship between an evaluated value E and a rendered right prism model when a node 16 is an active node.

FIG. 17 is an explanatory drawing showing a relationship between the evaluated value E and the rendered right prism model when the node 16 is an active node. In FIG. 17, the child right prism model is rendered in the state of E=Th1, and the child right prism model is rendered while the height of the child right prism model is changed in the state of Th3<E<Th1. Further, in the state of Th3<E<Th2, the active right prism model is rendered in a semi-transparent way after the child right prism model is rendered. In the state of E=Th3, only the active right prism model is rendered.

In the example shown in FIG. 17, when the right prism model selected by the tree structure updating unit 21 is changed to the right prism model brought into correspondence with a child node of the last time selected right prism model, the evaluated value E of the active node moves rightward in the figure. In contrast, when the right prism model selected by the tree structure updating unit 21 is changed to the right prism model brought into correspondence with the parent node of the last time selected right prism model, the evaluated value E of the active node moves leftward in the figure.

As can be seen from the above description, the approximate right prism model generating unit 14 in accordance with this Embodiment 1 is constructed in such a way as to, when generating an approximate right prism model, express a hierarchical relationship among the original right prism models and approximate right prism models which can be generated by using a tree structure, and generate only approximate right prism models existing in certain and higher hierarchical layers from among the approximate right prism models which are respectively brought into correspondence with nodes in the tree structure. Therefore, there is provided an advantage of being able to render a three-dimensional virtual environment at a high speed and with a high degree of quality even when no large-volume storage unit is installed.

Further, the approximate outline generating unit 12*a* in accordance with this Embodiment 1 is constructed in such a way as to, when selecting a group of two outlines which is a target for approximation, evaluate the degree of ease of unifying each group of two outlines in consideration of the distance or the difference in height between the two outlines to select the group of two outlines which provides the highest ease of unifying the outlines as the group of two outlines which is the target for approximation. Therefore, there is provided an advantage of being able to reduce the difference in shape between the outlines which are the target for approximation and an approximate outline.

Further, the tree structure updating unit 21 in accordance with this Embodiment 1 is constructed in such a way as to estimate the degree of contribution of each right prism model recorded in the storage unit 2 to the rendering result, and select a right prism model which is a target to be rendered according to the degree of contribution to the rendering result. Therefore, there is provided an advantage of being able to improve the rendering quality of the right prism model.

The rendering unit 22 in accordance with this Embodiment 1 is constructed in such a way as to, when the right prism model selected by the tree structure updating unit 21 is changed to the right prism model brought into correspondence with the parent node of the last time selected right prism model, repeat the rendering of the last time selected right prism model while enlarging or reducing the last time selected right prism model until the height of the last time selected right prism model matches that of the right prism model brought into correspondence with the parent node, and, after that, renders the right prism model brought into correspondence with the parent node on the last time selected right prism model in a semi-transparent way and repeats the rendering of the right prism model brought into correspondence with the parent node while increasing the degree of untransparency of the right prism model. Therefore, there is provided an advantage of being able to reduce visual changes at the time that the right prism model which is the target to be rendered is switched to the right prism model brought into correspondence with the parent node, thereby maintaining the dynamic image quality at a high level.

Further, the rendering unit 22 in accordance with this Embodiment 1 is constructed in such a way as to, when the right prism model selected by the tree structure updating unit 21 is changed to the right prism model brought into correspondence with a child node of the last time selected right prism model, the rendering unit renders the right prism model brought into correspondence with the child node after enlarging or reducing the right prism model in such a way that the height of the right prism model currently brought into correspondence with the child node matches that of the last time selected right prism model, and, after rendering the last time selected right prism model on the right prism model brought into correspondence with the child node in a semi-transparent way, repeats the rendering of the last time selected right prism model while increasing the degree of transparency of the last time selected right prism model until this right prism model becomes transparent, and then repeats the rendering of the right prism model currently brought into correspondence with the child node while enlarging or reducing the right prism model currently brought into correspondence with the child node until the height of the right prism model brought into correspondence with the child node returns to its original height. Therefore, there is provided an advantage of being able to reduce visual changes at the time that the right prism model which is the target to be rendered is switched to the right prism model brought into correspondence with a child node, thereby maintaining the dynamic image quality at a high level.

While the invention has been described in its preferred embodiment, it is to be understood that various changes can be made in an arbitrary component in accordance with the embodiment, and an arbitrary component in accordance with the embodiment can be omitted within the scope of the invention.

INDUSTRIAL APPLICABILITY

The present invention is suitable for a three-dimensional image display device that is not equipped with any large-volume storage unit in order to display a three-dimensional image according to three-dimensional geometrical information.

The invention claimed is:

1. A three-dimensional image display device comprising:
at least one processor to execute a program; and
a memory to store said program which, when executed by the processor, results in performance by the processor of the following programmed instructions,
carrying out a process of selecting a group of right prism models which is a target for approximation from among a set of right prism models each of which is a three-dimensional model expressing a three-dimensional shape of a right prism, and unifying said group of right prism models to generate an approximate right prism model, and for repeatedly carrying out a process of selecting a group of right prism models which is a target for approximation from among the approximate right prism model generated thereby and the right prism models included in said set, and unifying said group of right prism models to generate an approximate right prism model, wherein
when generating an approximate right prism model, 1) using, for generation of an approximate right prism model, a tree structure hierarchy identifying which of the right prism models to unify, and 2) thereafter generating one or more right prism models from the tree structure hierarchy formed by unification of more than two of the right prism models,
storing the right prism models included in said set and the one or more right prism models,
selecting a right prism model which is a target to be rendered from among the right prism models stored,
rendering the right prism model selected,
wherein
the processor further executes estimating a degree contribution of a right prism model which has been selected last time, among the right prism models stored, to a rendering result,
when the degree of contribution which is an estimation result is greater than a first threshold, the processor selects a right prism model brought into correspondence with a child node of the right prism model which has been selected last time,
when said degree of contribution is less than a second threshold less than said first threshold, the processor selects a right prism model brought into correspondence with a parent node of the right prism model which has been selected last time,
when said degree of contribution is equal to or less than said first threshold and is equal to or greater than said second threshold, the processor selects the right prism model which has been selected last time, and
when the right prism model selected is changed to the right prism model brought into correspondence with the parent node of the last time selected right prism model, the processor repeats rendering of the last time selected right prism model while enlarging or reducing the last time selected right prism model until a height of the last time selected right prism model matches that of the right prism model brought into correspondence with the parent node, and, after that, the processor renders the right prism model brought into correspondence with the parent node on the last time selected right prism model in a semi-transparent way and repeats the rendering of the right prism model brought into correspondence with the parent node while increasing a degree of untransparency of the right prism model brought into correspondence with the parent node.

2. The three-dimensional image display device according to claim 1, wherein the processor further executes, when selecting a group of right prism models which is a target for approximation, evaluating a degree of ease of unifying each group of two of the right prism models in consideration of a distance or a difference in height between the two right prism models to select a group of right prism models which provides a highest ease of unifying these right prism models as the group of right prism models which is the target for approximation.

3. The three-dimensional image display device according to claim 1, wherein the processor further executes estimating a degree of contribution of each of the right prism models to a rendering result, and the processor selects the right prism model which is the target to be rendered according to the degree of contribution to the rendering result.

4. The three-dimensional image display device according to claim 1, wherein, when the right prism model is changed to the right prism model brought into correspondence with the child node of the last time selected right prism model, the processor renders the right prism model brought into correspondence with the child node after enlarging or reducing this right prism model in such a way that a height of the right prism model brought into correspondence with the child node matches that of the last time selected right prism model, and,
after rendering the last time selected right prism model on the right prism model brought into correspondence with the child node in a semi-transparent way, the processor repeats the rendering of the last time selected right prism model while increasing a degree of transparency of the last time selected right prism model until this right prism model becomes transparent, and then
the processor repeats the rendering of the right prism model brought into correspondence with the child node while enlarging or reducing this right prism model until the height of the right prism model brought into correspondence with the child node returns to its original height.

5. A non-transitory computer readable medium including a three-dimensional image display program that includes computer executable instructions for an approximate right prism model generation processing procedure, comprising
carrying out a process of selecting a group of right prism models which is a target for approximation from among a set of right prism models each of which is a three-dimensional model expressing a three-dimensional shape of a right prism, and unifying said group of right prism models to generate an approximate right prism model, and for repeatedly carrying out a process of selecting a group of right prism models which is a target for approximation from among the approximate right prism model generated thereby and the right prism models included in said set, and unifying said group of right prism models to generate an approximate right prism model, wherein
said approximate right prism model generation processing procedure includes a procedure for, when generating an approximate right prism model, 1) using, for generation of an approximate right prism model, a tree structure hierarchy identifying which of the right prism models to unify, and 2) thereafter generating one or more right prism models from the tree structure hierarchy unification of more than two of the right prism models, a right prism model storage processing procedure for storing the right prism models included in said set and the one or more right prism models generated in said approximate right prism model generation processing procedure in a storage unit, a rendering model selection processing procedure for selecting a right prism model which is a target to be rendered from among the right prism models stored in said storage unit, a right prism model rendering processing procedure for rendering the right prism model selected in said rendering model selection processing procedure, and further executing estimating a degree contribution of a right prism model which has been selected last time, among the right prism models stored, to a rendering result, when the degree of contribution which is an estimation result is greater than a first threshold, selecting a right prism model brought into correspondence with a child node of the right prism model which has been selected last time, when said degree of contribution is less than a second threshold less than said first threshold, selecting a right prism model brought into correspondence with a parent node of the right prism model which has been selected last time, when said degree of contribution is equal to or less than said first threshold and is equal to or greater than said second threshold, selecting the right prism model which has been selected last time, and when the right prism model selected is changed to the right prism model brought into correspondence with the parent node of the last time selected right prism model, repeat rendering of the last time selected right prism model while enlarging or reducing the last time selected right prism model until a height of the last time selected right prism model matches that of the right prism model brought into correspondence with the parent node, and, after that, the processor renders the right prism model brought into correspondence with the parent node on the last time selected right prism model in a semi-transparent way and repeat the rendering of the right prism model brought into correspondence with the parent node while increasing a degree of untransparency of the right prism model brought into correspondence with the parent node.

* * * * *